United States Patent
Folkens et al.

(10) Patent No.: US 7,077,250 B2
(45) Date of Patent: Jul. 18, 2006

(54) VISCOUS DAMPER FOR MACHINERY MOUNTING

(75) Inventors: Jerry D. Folkens, Naperville, IL (US); Harold E. Reinke, Naperville, IL (US); Steven M. Veroeven, Willow Springs, IL (US); Joseph L. Bastl, Willowbrook, IL (US)

(73) Assignee: Vibro/Dynamics Corporation, Broadview, IL (US)

( * ) Notice: Subject to any disclaimer, the term of this patent is extended or adjusted under 35 U.S.C. 154(b) by 65 days.

(21) Appl. No.: 10/829,540

(22) Filed: Apr. 22, 2004

(65) Prior Publication Data

US 2004/0195065 A1   Oct. 7, 2004

Related U.S. Application Data

(63) Continuation-in-part of application No. 09/935,262, filed on Aug. 22, 2001, now abandoned.

(51) Int. Cl.
*F16F 7/10* (2006.01)
*F16M 13/00* (2006.01)

(52) U.S. Cl. ............... 188/380; 267/127; 248/631

(58) Field of Classification Search ............... 188/378, 188/379, 380; 267/34, 136, 137, 217, 113, 267/226, 256, 121, 124, 126, 127; 248/562, 248/565, 615, 631, 636; 52/167.1, 167.8, 52/167.7
See application file for complete search history.

(56) References Cited

U.S. PATENT DOCUMENTS

| | | | |
|---|---|---|---|
| 2,319,735 A | 5/1943 | Hussman | |
| 2,597,800 A | 5/1952 | Hussman | |
| 3,288,419 A | 11/1966 | Wallerstein, Jr. | |
| 3,658,314 A | 4/1972 | Luzsicza | |
| 4,648,577 A | 3/1987 | Weber | |
| 5,379,991 A | 1/1995 | Delam et al. | |
| 5,595,371 A | 1/1997 | Hukuda et al. | |
| 2003/0038005 A1 | 2/2003 | Folkens et al. | |

FOREIGN PATENT DOCUMENTS

| | | | |
|---|---|---|---|
| DE | 4213043 A1 | * | 10/1993 |
| DE | 4322191 A1 | * | 1/1995 |
| FR | 1.128.058 | | 1/1957 |
| JP | 56066539 A | | 6/1981 |
| JP | 59043243 A | | 3/1984 |
| JP | 04370438 A | | 12/1992 |

* cited by examiner

*Primary Examiner*—Thomas Williams
(74) *Attorney, Agent, or Firm*—Cook, Alex, McFarron, Manzo, Cummings & Mehler, Ltd.

(57) ABSTRACT

A viscous damper for a machinery mount having a damping member disposed intermediate a top support engageable with at least a portion of a load and a bottom plate disposed beneath the support and spaced therefrom to thereby decrease or deaden vibrations. The damper includes a receptacle for vertical disposition, which is closed at the bottom and opened at the top, and is adaptable for containing a viscous fluid. A plunger of smaller lateral dimensions is arranged concentrically and co-axially within the receptacle, and depends downwardly from the horizontally disposed support, and is of such a longitudinal dimension as to be spaced from the closed bottom of the receptacle so as to be submerged partially in the viscous fluid and is therefore free to move vertically. A perforated plate is affixed at the bottom of the plunger, and provides fluid communication between the receptacle and the plunger. The damping effected by the vibrations will force the viscous medium through the apertures in the bottom plate in one direction or the other.

18 Claims, 9 Drawing Sheets

VISCOUS DAMPER FOR MACHINERY MOUNTING

CROSS REFERENCE TO RELATED APPLICATION

This application is a continuation-in-part of U.S. Ser. No. 09/935,262, filed Aug. 22, 2001 now abandoned.

FIELD OF THE INVENTION

This invention relates to a vibration damper. More specifically, this invention relates to a viscous damper, incorporated in a machinery mounting or isolator system, to substantially decrease or deaden vibrations caused by forces external or internal to the machine.

BACKGROUND AND PRIOR ART

Extremely heavy loads such as machinery, equipment, presses, and the like, are subjected to shock and vibration and are susceptible to misalignment due to these forces and/or due to settling including settling of the building floor or building foundation. (As used herein and in the appended claims, the term "machinery" is used generically, and is intended to include all such machinery, equipment, apparatus, etc.) Proper alignment, including leveling, flatness, and the like, is essential in order to operate efficiently, economically and safely. Therefore it is important to diminish or substantially eliminate shock and vibrations.

The prior art discloses various types or designs of adjustable mounts or isolating mounts to correct for out-of-level or out-of-flatness conditions. In addition, it is desirable to protect or isolate the machinery from the surrounding environment as much as possible from the damaging effects of shock and vibration generated by the machinery. Heavy machinery, for example punch presses standing twenty feet or higher and weighing as much as a million pounds or more, can be damaged or become misaligned. Therefore it is necessary to absorb or dampen as much of the shock and vibration as possible. Isolators utilized for this purpose, as known or shown in the art, incorporate, in general, a damping means interposed between the load and a bearing member positioned on a substructure, and include friction isolating dampers, hydraulic isolating dampers, and viscous isolating dampers. In the prior art, the isolating machinery mount typically incorporates an elastomeric cushion member, which is positioned below a bearing member and rests on the substructure or building floor. In this manner, the machine is protected from undersirable shock and vibrations.

This prior art includes, for example, U.S. Pat. Nos. 3,332,647; 4,047,427; 4,648,577; and 4,846,436. In U.S. Pat. No. 4,648,577, a damper plunger of a frusto-conical configuration includes a top plate for supporting the load (i.e., the machinery) and is positioned for movement in and out of a housing containing a viscous damping medium. The frustum plunger has holes in the wall for throttling the viscous medium upon movement of the viscous medium, and preferably includes a bank of tubes to provide an additional damping force.

SUMMARY OF THE INVENTION

In accordance with the present invention, there is provided an improved vibration isolating mounting system for machinery, or the like, for at least a portion of a load positioned or arranged on a substructure, such as a building floor. The vibration isolating mount includes a horizontally disposed top member or platform engageable with at least a portion of the load (e.g., the foot of a machine), and a bottom member disposed beneath the top member and spaced therefrom. The vibration isolating mounting system includes a damping member disposed between the top member or platform and the bottom member to decrease or deaden vibrations caused by external and internal forces. The damping member comprises a viscous vibration damper to minimize or substantially eliminate shock and vibrations, and is incorporated in and useful of a machinery mount for supporting at least a portion of a load to be positioned on a substructure such as the floor of a building.

The damping member includes a receptacle, vessel, or the like, having a closed bottom and open top, and, as viewed in cross-section relative to the longitudinal axis of the receptacle, opposed vertical, parallel walls. The receptacle or vessel is adaptable for containing a viscous fluid or damping fluid. In a preferred embodiment of the invention, the receptacle or vessel is seated directly onto the bottom member, and both typically being metallic, e.g. steel, the receptacle or vessel can be welded at the marginal edge or perimeter to the bottom member. In this manner, this receptacle or vessel is closed at the bottom, thereby obviating the need for a separate metal bottom as a closure. A plunger, having opposed vertical, parallel walls as viewed in vertical cross-section, is of smaller horizontal dimensions than the receptacle or vessel and is arranged concentrically and co-axially therewith so as to be spaced from the walls of the receptacle or vessel. The plunger depends downwardly from the horizontally disposed top member or platform, and is of such a longitudinal dimension as to be spaced from the closed bottom of the receptacle or vessel so as to be submerged partially in the viscous fluid. Thus, the plunger, being spaced from the bottom of the receptacle or vessel, is therefore free to move or reciprocate in the viscous medium vertically, horizontally, rotationally, and on an angle relative to the horizontal and with reference to the receptacle. A transverse bottom plate member is affixed at or near the bottom of the plunger, and the bottom plate member is provided with a plurality of apertures or openings to provide fluid communication between the receptacle or vessel and the plunger. Where desired, the bottom plate is comprised of two or more plates with aligned apertures to enhance the damping forces. The vertical motion of the plunger will force the viscous medium through the apertures in one direction or the other.

It will be observed that the receptacle or vessel is affixed to the bottom member so as to enclose the bottom of this vessel, and the plunger is affixed to the top member or platform to enclosed the top of the plunger. Where desired, the receptacle or vessel and the plunger may be provided with an enclosed end, which is then affixed to the bottom member and top member, respectively, but is preferably affixed, each at its marginal edge or perimeter to the bottom member and to the top member. In order to provide sufficient strength to the unit, there is provided at least one strengthening member of still smaller dimensions than the plunger so as to be disposed interiorily of the plunger. The strengthening member extends downwardly from the top platform and terminates at the perforated plate, so as to enhance the strength of the damping unit.

It should be understood that the receptacle and plunger may have any desired cross-section, as viewed in plan, including circular, rectangular, and elliptical, and that the configuration of each such member is the same, as viewed in horizontal cross-section. It will be observed that the side walls of each such member are therefore parallel, as viewed in vertical cross-section. Further, the walls of each such member are spaced equally from an adjacent member to provide a fluid movement in that region that achieves maximum damping.

BRIEF DESCRIPTION OF THE ACOMPAYING DRAWINGS

The invention and its advantages will be more readily understood by reference hereto the following detailed description and exemplary embodiments when read in conjunction with the following drawings, wherein.

DETAILED DESCRIPTION OF THE INVENTION

Figure 1:
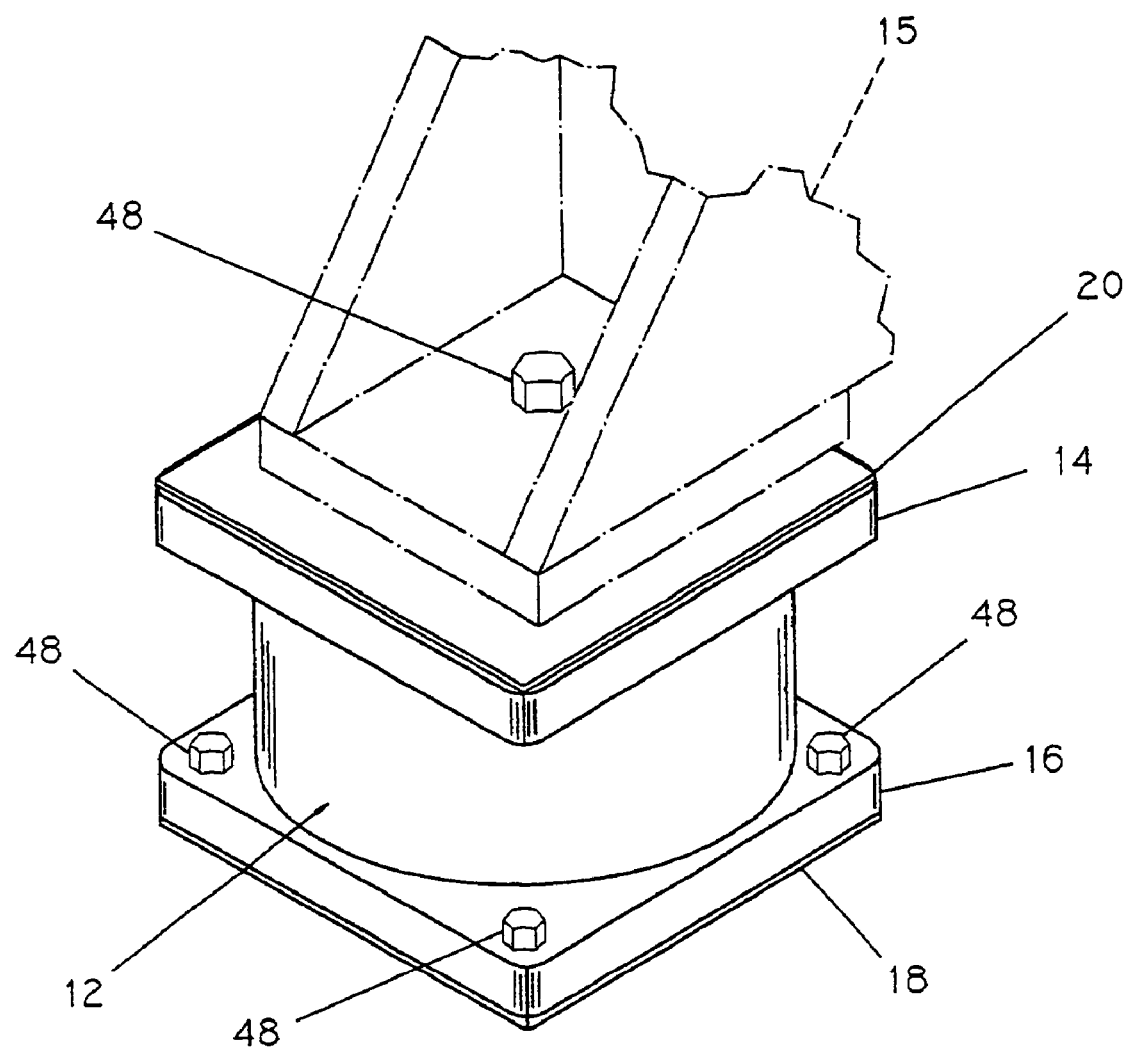
FIG. 1 is a perspective view of a viscous damper embodying the features of the present invention and useful in conjunction with a machinery mounting system supporting a load.

In referring to the drawings, wherein like reference numerals designate similar parts throughout the several views, there is illustrated in FIG. 1 a machine mounting system or isolator, generally indicated by the numeral 10, to absorb vibrations and shock. The machinery mount 10 is illustrated more specifically in FIGS. 2 and 3, and is a vibration isolation mounting system incorporating the features of a viscous damper. The machine mounting system 10 includes a damper, indicated generally by the numeral 12 and described below in detail, a horizontally disposed top member or platform 14 for supporting a load 15, and a bottom or bearing member 16 seated on a substructure (not shown) spaced below the top member. The load member 15, shown in phantom, may be a foot of a heavy machine seated on the top member or platform 14, which typically has a substantially planar top surface. The bottom or bearing member 16 is positioned on a substructure such as the floor of a building (not shown). The isolator system typically includes an elastomeric cushion 18 disposed in immediate supporting relationship below the bottom or bearing member 16, and includes a similarly elastomeric cushion 20 disposed in immediate supporting relationship below the load. Although there is illustrated a single mounting unit (see FIGS. 2 and 3), it should be understood that the same unit can be used at each of the various mounting points of a machine, e.g., along one side of a machine, for absorbing shock and vibrations, and that a machine may have multiple mounting points.

Referring now to FIGS. 4–7, the mounting system or isolator 10 having a damper 12 includes a substantially cylindrical metal member 22 as a receptacle, container, vessel, or the like, disposed in a vertical position, that is, the longitudinal axis of the vessel is essentially vertical and substantially normal to the bearing member 16. It should be understood that the terms receptacle, container, vessel, vat, tank, tub, and the like, may be used herein and in the appended claims interchangeably as synonymous terms referring to the receptacle for holding the viscous fluid 24. Although the receptacle for this embodiment is described as cylindrical, it should be understood that other configurations can be used, as explained below. The receptacle 22 is seated on the bottom or bearing member 16, such as a metal plate, which is spaced from a base member or substructure not shown (e.g., floor) by a resilient member 18, such as an elastomeric cushion disposed on the substructure. The receptacle 22 is affixed at the bottom marginal edge to the metal bearing plate 16, by welding or the like, so as to be fluid-tight. Further, receptacle 22 is open at the top, and a damping fluid 24 (see FIG. 5) is added to the receptacle, for the reasons explained below in detail.

The bottom or bearing member 16 is spaced from the substructure or building floor by the elastomeric cushion 18, and the top or support member 14 is spaced from the load 15 by elastomeric cushion 20. Thus, vibrations transmitted through the floor (or foundation) below the cushion member 18 will be dampened at least partially and not fully transmitted to any equipment resting on the machinery supporting member 16. Similarly, vibrations or impact forces generated by the operation of a machine resting on member 16 will be only partially transmitted to the floor through the mount 10 and damping member 12.

A plunger 26 of substantially uniform cross-section depends downwardly from the bottom surface or underside of the top member or platform 14, and is affixed thereto at its top marginal edge by, e.g., welding. The plunger is of smaller diameter than the receptacle, and is disposed interiorly of the receptacle so as to be concentric therewith. In addition, the two cylinders are disposed co-axially. Because the plunger is of smaller diameter than the receptacle, the cylinder wall of the plunger is spaced an equidistance from the wall of the receptacle about its perimeter. The walls of both cylindrical members exhibit sufficient strength so not to fail by the force of the damping fluid. The vertical or longitudinal dimension of the plunger 26 is selected so that its bottom perimeter or marginal edge is spaced from the bottom of the receptacle 22. Therefore, the plunger is free to move vertically upon vibration movement of the supporting member without contacting the closed bottom of the receptacle. As a consequence, the plunger is submerged partially in the damping fluid. It will be observed that the plunger 26 extends above the surface of the viscous medium 24, and in this upper portion of the plunger wall there is provided one or more transverse openings 27 are above the surface of the viscous medium.

Figure 10:
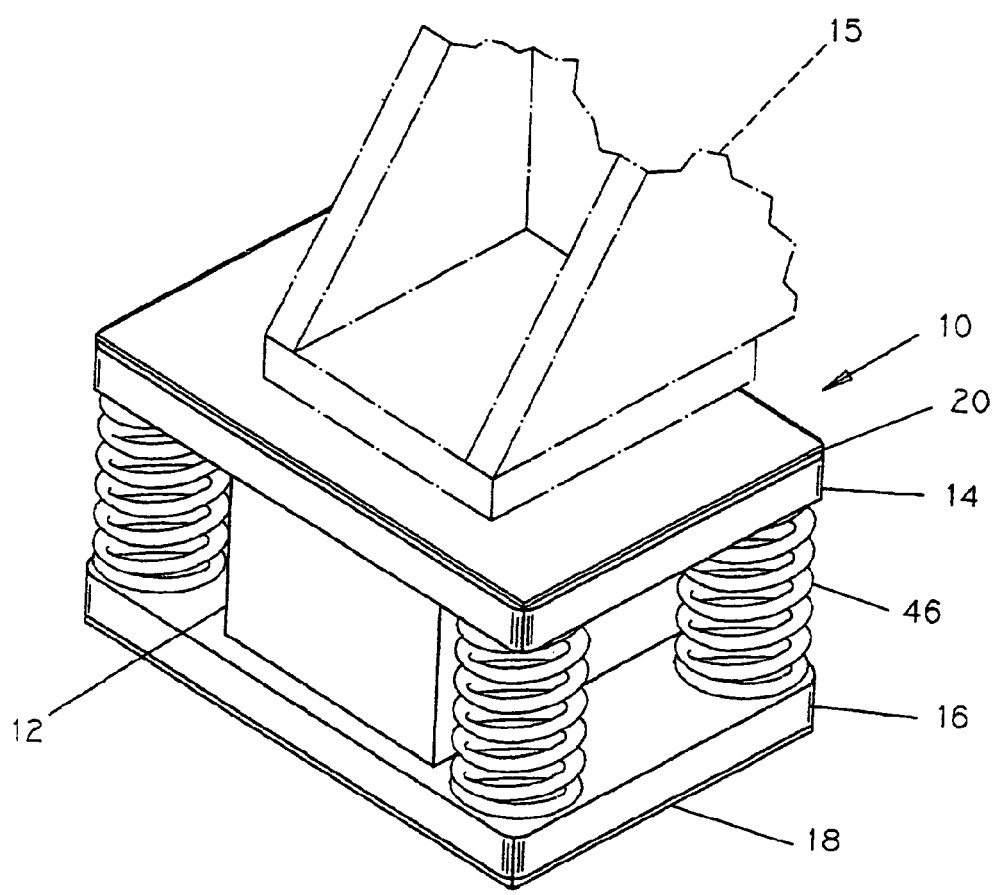
FIG. 10 is a view similar to FIGS. 1, 2 and 3 illustrating a modified embodiment of the invention.
Figure 11:
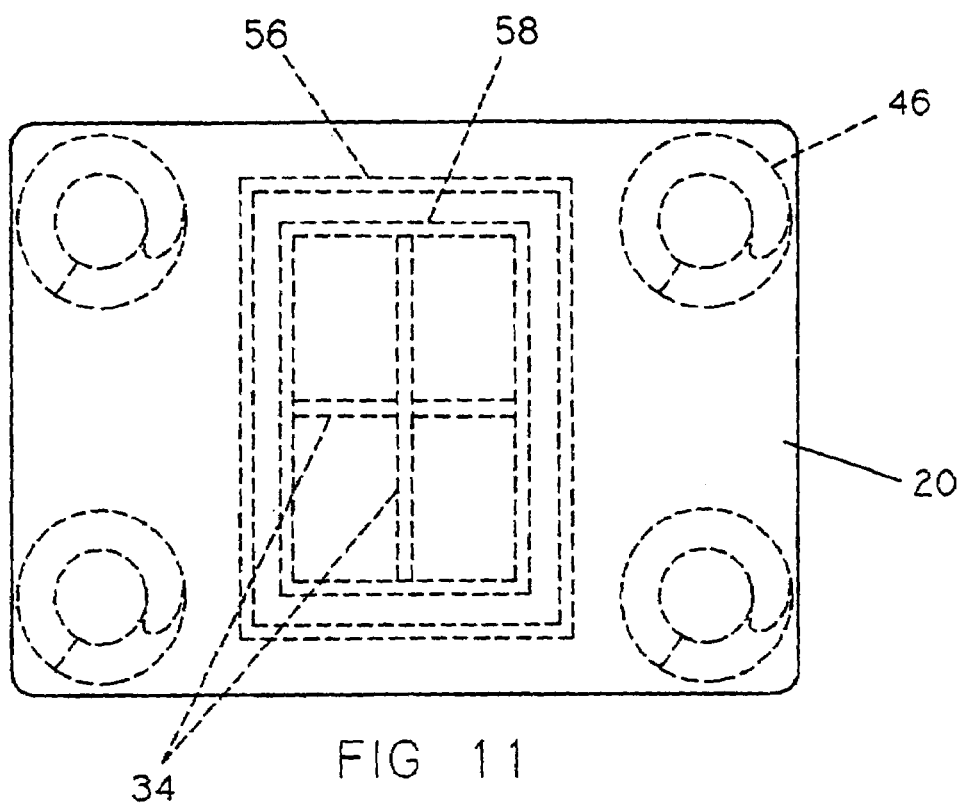
FIG. 11 is a plan view of the vibration isolation mount of the type shown in FIG. 10 showing in some detail the damper features of the present invention.
Figure 12:
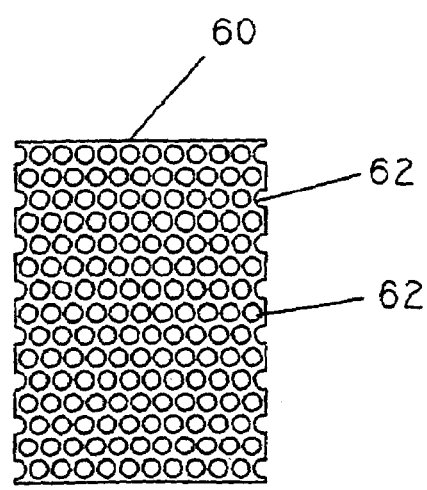
FIG. 12 is a plan view of the bottom plate, which is perforated, used in the alternative embodiment of the vibration damper of the invention shown in FIG. 10 and FIG. 11.

Although the embodiment of the invention described in the FIGS. 4–7 relates to a cylindrical receptacle and cylindrical plunger, it should be understood that the invention may take other configurations, such as rectangular, as shown in an alternative embodiment of the invention in FIGS. 10–12. Also, the opposed vertical or longitudinal walls of the receptacle and the plunger, as viewed in cross-section, are parallel, and the spacing between the walls of the receptacle and of the plunger are equal (see FIGS. 4, 5, 11 and 14).

Figure 7:
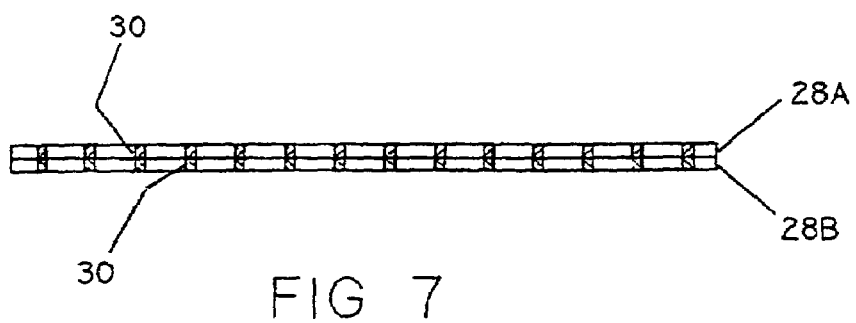
FIG. 7 is an elevational view, in cross-section, taken on line 7—7 of FIG. 6, and illustrating the bottom plate.

At about the bottom of the plunger 26 is plate member 28, disposed transversely to the longitudinal axis of the plunger, which has a plurality of openings or apertures 30. The thickness of the plate 28 is important in order to provide a plate with sufficient strength and with sufficient damping. Where desired, one can provide two or more essentially identical plates 28A and 28B (see FIG. 7). The plate, or the plates in the aggregate, preferably have a thickness ranging from about 0.06 inch to 1.0 inch. When multiple plates, e.g. two plates, are assembled or stacked, as shown in FIG. 7, the openings 30 are aligned to provide for the easy flow of damping fluid through the openings. It should be understood that the openings need not be circular, as shown, but can be of other configurations such as oval, hexagonal, or octagonal. The open area for each plate ranges from about 35 percent to 60 percent of the total area. As is known, the thickness of the plates and the open area of the plates affect the damping and the cavitation. For purposes of this invention, cavitation is defined as small voids (i.e., bubbles) in the fluid that coincide with a loss of damping. There is an increased damping with thicker plates, but also an increase in cavitation. The higher the closed or restricted area, relative to the open area, the stiffer the damper and the greater the damping effect. If, however, the closed area is too high, there is increased cavitation. These parameters may be selected to optimize performance of the damper, and may vary depending upon the specific need, the size of the damper, and also other factors such as the viscosity of the fluid medium.

The distance between the cylindrical walls of the receptacle 22 and the plunger 26 can be selected or determined in order to provide for the optimum damping effect for any particular machine mounting system. As explained below in detail, the vertical displacement of the plunger forces the viscous medium to flow through the perforated plate and between the receptacle 22 and plunger 26 in one direction or the other. If the walls are too close, the shear in the damping fluid is too great, which causes cavitation. If, however, the walls are too far apart, the damping effect is diminished or lost. The optimum distance between walls can vary depending upon such factors as the relative volumes of the members 22 and 26, the size or weight of the machine, and the type and viscosity of the fluid. For many machinery mounts, a suitable radial distance between the receptacle and plunger may range from about ⅜ths inch to about 2 inches.

Figure 5:
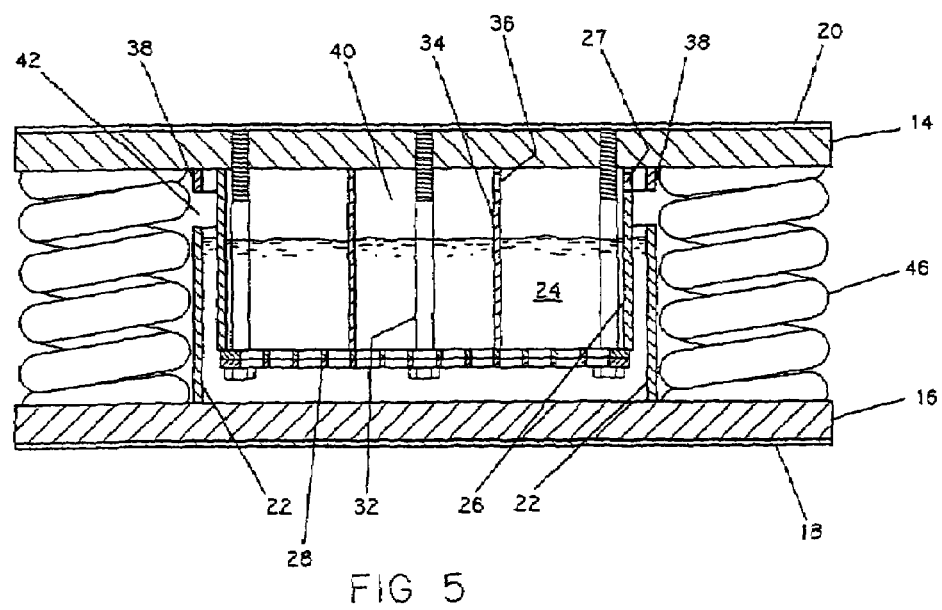
FIG. 5 is an elevational view, in cross-section, taken on line 5—5 of FIG. 4, and illustrating the vibration damper in greater detail.
Figure 6:
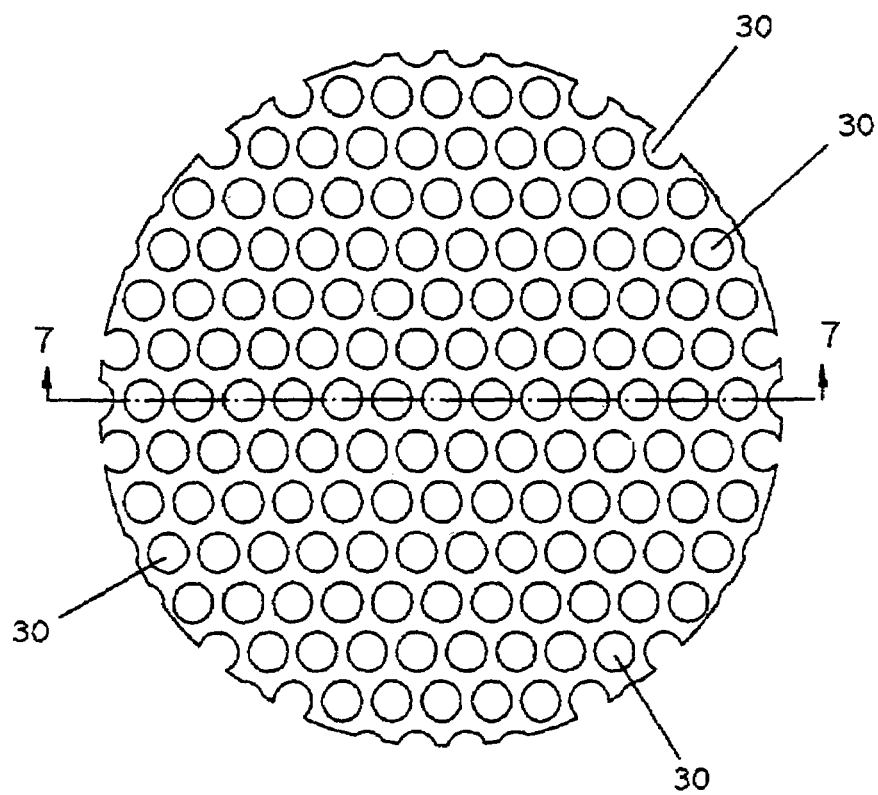
FIG. 6 is a plan view of the bottom plate, which is perforated, used in the vibration damper of the invention.

In order to provide sufficient strength to the machine mount or damper system, there is provided one or more fastening elements comprising bolts 32. As shown in FIG. 5, there are three bolt members 32 arranged symmetrically, but this number can vary depending upon the particular application. This need for supplementing the overall strength is particularly useful in providing for a secure connection of the plunger 26 and the plate 28. Thus, the threaded bolts 32 extend from the plate member 28 to the top or supporting member 14, which has complementary threaded bores for receiving the treaded end of the bolts 32. It is preferred to weld the plunger 26 at its top marginal edge to the underside or bottom of the support member 14. Thus, the fastening elements 32 will serve to reduce the weld fatigue. If any part of the weld should break, the fastening elements 32 maintain the attachment between the plunger and the top or support member. It should be understood, however, that the fastening elements can be omitted, which is more likely for a smaller isolator system.

Figure 4:
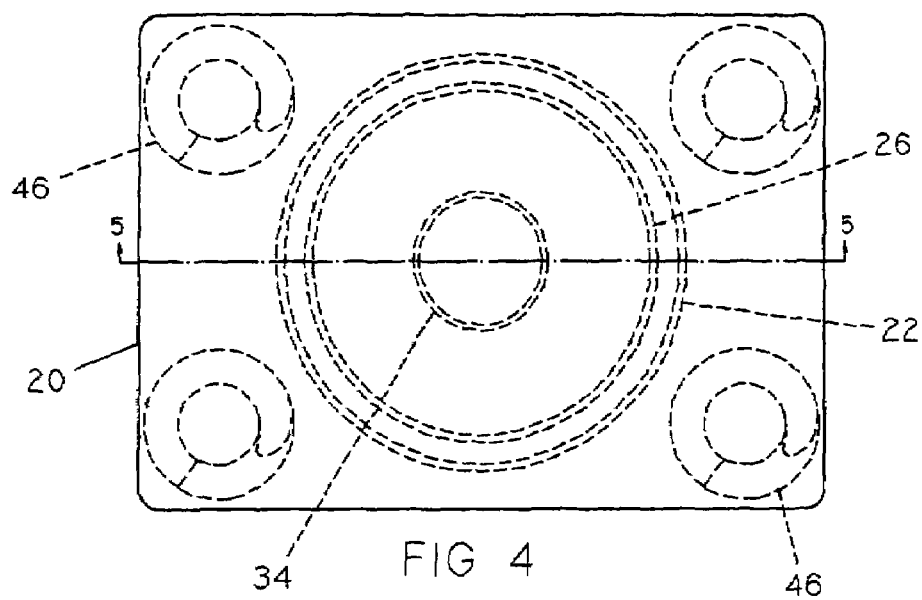
FIG. 4 is a plan view of the vibration isolation mount of the type shown in FIG. 2 showing some of the detail of the damper features of the present invention, and embodying the features of the present invention.

One or more strengthening members 34, such as a cylindrical tubes shown in FIG. 4, or as longitudinally extending plates shown FIG. 11 and discussed below, extends between the perforated plate 28 and the top member or platform 14, and are affixed at both ends by, e.g., welding. The strengthening member is positioned on the interior of the plunger 26 in order to provide strength to the machine mounting system and support for the perforated plate 28. If the strengthening member is tube-like or cylindrical as shown in FIG. 4, it is arranged concentric with the plunger, the walls of each such strengthening member being parallel as viewed in vertical cross-section, and the space between adjacent members being equidistant. The number of such strengthening members 34, e.g. cylindrical tubes, can vary depending upon such factors as the size of the isolator, the size and dimensions of the perforated plate, and the type of viscous fluid. Thus, in FIGS. 4 and 5, there is shown one such tube 34, while the mounting system shown in FIG. 9 utilizes three such tubes arranged concentrically and symmetrically. If the support for the interior is not sufficient or is lacking, the perforated plate 28 may flex during operation of the isolator. This flexing reduces damping, because the plate is moving with the viscous fluid instead of the fluid being forced through the holes in the plate. That portion of the strengthening members extending above the surface of the viscous fluid 24 is provided with one or more openings 36 to equalize the air pressure during operation.

Figure 2:
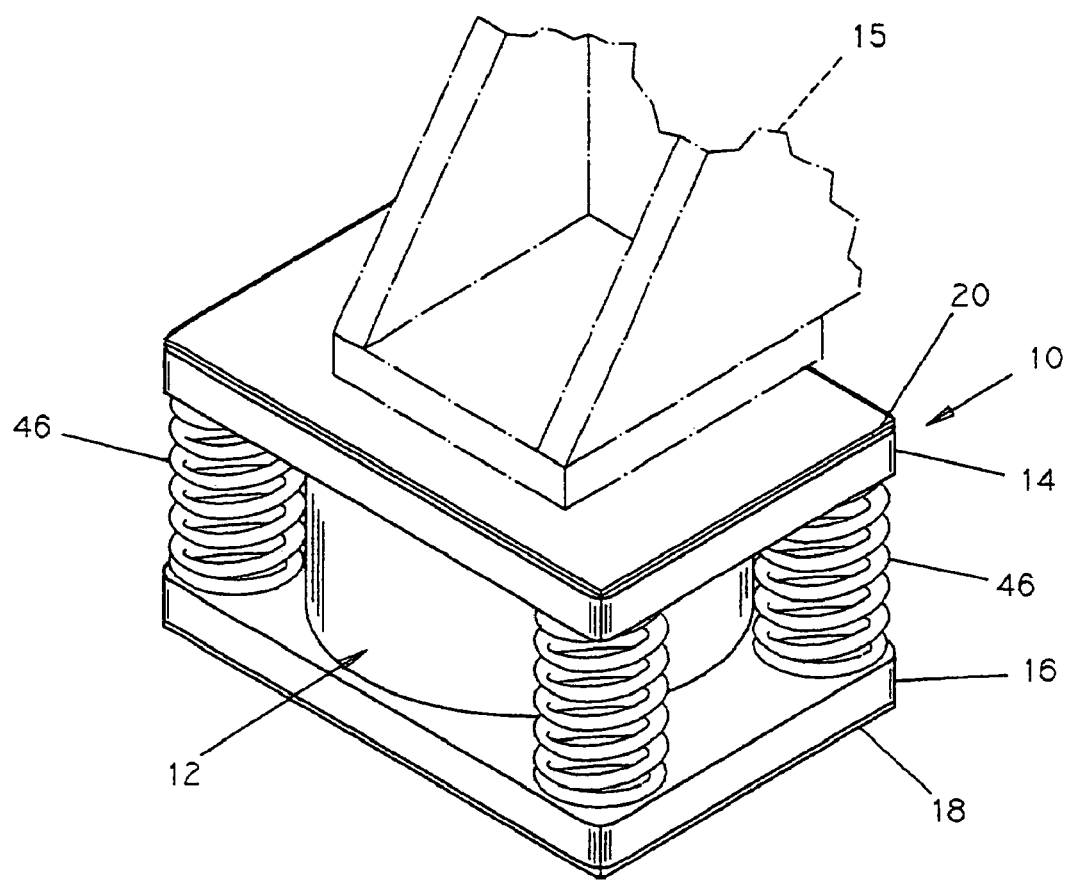
FIG. 2 is perspective view showing a viscous damper as in FIG. 1 and illustrating a modified embodiment for utilizing springs for the mounting system.
Figure 3:
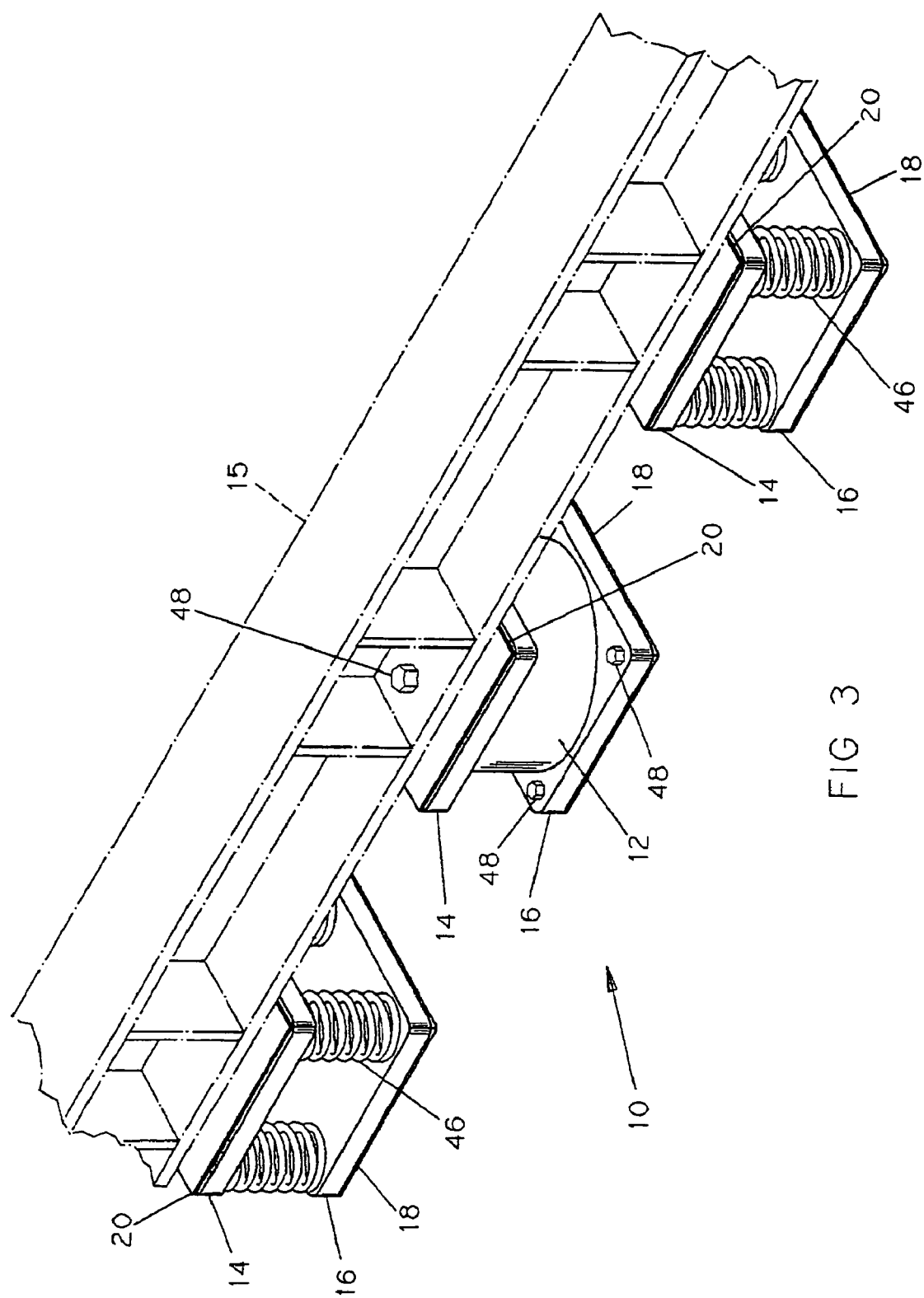
FIG. 3 is perspective view of a machinery mounting system similar to that of FIG. 2 showing a viscous damper as in FIG. 1 and illustrating a modified embodiment for utilizing springs for the mounting system.
Figure 8:
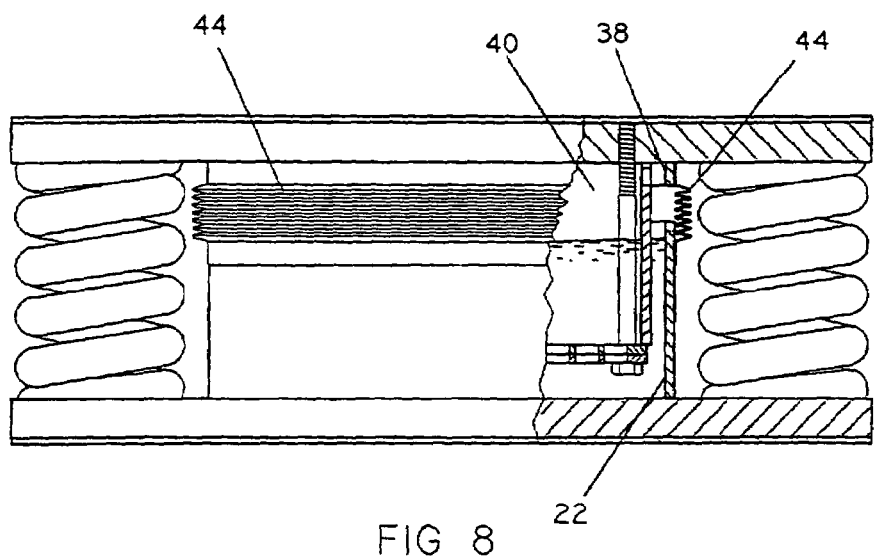
FIG. 8 is an elevational view, partially broken away, and in cross-section, of the damper of FIG. 2 illustrating the use of a bellows.

It will be observed that the receptacle 22 need be of sufficient height to contain the required quantity of viscous fluid 24, thereby avoiding any overflow of the fluid upon vibration amplitude or fluctuations in the level of the fluid. Annular member or rim 38 depends downwardly from top member or platform 14, and is of essentially the same lateral dimensions as receptacle 22 and co-axial therewith so as to define chamber 40 above the fluid. Thus, if the receptacle 22 is cylindrical, the rim 38 is of the same diameter, whereas if the receptacle is rectangular, then the length and width are the same for both the receptacle and the rim. The marginal edge of rim 38 is spaced from the marginal edge of the receptacle 22, thereby forming an opening or gap 42. A side seal in the form of a bellows 44 surrounds the annular member 38 and the top of the receptacle 22, thereby spanning the gap 42, which is in communication with chamber 40 through opening 27. (See FIGS. 8 and 9.) The bellows are commercially available and typically comprise a neoprene-coated fabric. The bellows serve as a flexible seal to prevent both leakage and contamination of the viscous fluid.

Where desired, springs 46 are arranged outside of the damper 12, and extend between the top member or platform 14 and the bottom member or bearing member 16. The springs support the load and help to regulate and maintain the relative positioning or spatial relationship of the members 14 and 16. As shown in FIG. 2, four springs are positioned symmetrically adjacent the cylindrical member 22 of the damper 12 and between the same top member 14 and bottom member 16, and optionally a protective cover (not shown) may be provided to protect the springs from dirt, oil, and the like. There is illustrated in FIG. 3 an alternative arrangement in which the springs 46 are positioned between a top member 14 and bottom member 16 and separated and spaced away from the viscous damper 12.

In operation, the machine mounting system including the damper and springs is first set up to support a load, such as the foot of a machine. Shock and vibrations forces emanating from the machine or through the floor will cause displacement of the damping medium. The damper of the invention, however, reduces or substantially abates the vibration amplitude, thereby enhancing the performance and wear of the machine.

Figure 9:
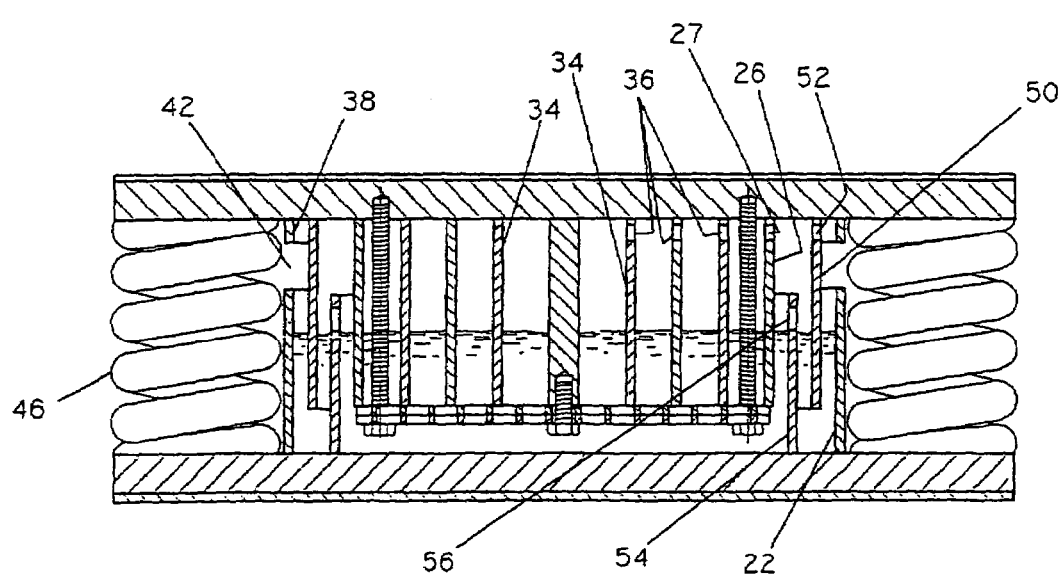
FIG. 9 is an elevational view, in cross-section, of the damper illustrating a modified embodiment of the invention.

This is illustrated in FIG. 9 a modification of the embodiment shown in FIG. 4 by providing a concentric arrangement of receptacles for the damping medium. In this embodiment, there is the outermost receptacle 22 having a closed bottom and seated on bottom member 16 for containing the damping medium. Arranged concentrically with receptacle 22 and inwardly thereof is substantially cylindrical tube 50, having an air vent 52, depending downwardly from supporting member 14 and terminating above the receptacle 22. Spaced inwardly from the cylindrical tube 50 is a second substantially cylindrical tube 54 extending upwardly from the bottom member disposed between tube 50 and the second cylindrical member 26. Cylindrical tube 54 is provided with an opening 56 positioned near the top of the tube and at about the level of the viscous fluid. The viscous fluid can flow through the opening or holes in the inner cylindrical tube 54 and thereby maintaining an equal level of fluid in the damper 12. Also, the walls of the two tubes 50 and 54 increase substantially the surface area for contact with the viscous medium. Because the fluid tends to grip or stick to the surfaces of the two tubes, the vibration amplitude of the viscous fluid and the movement of tube 50 up and down in the viscous fluid enhances the damping effect. Also, in accordance with this embodiment, there is shown a plurality of concentrically arranged strengthening tubes 34, and each tube is provided with an opening 36. This configuration can be advantageously used for larger dampers.

In accordance with the modified embodiment illustrated in FIGS. 10, 11 and 12, receptacle 56 and plunger 58 are rectangular. Also, the bottom plate 60, with apertures 62, is rectangular and is affixed to the bottom of the plunger. The opposed walls of the plunger and the receptacle are parallel, as viewed in cross-section, and the distance between the walls of these two members is the uniform throughout their perimeters, as explained above. Also, the strengthening member 34 is comprised of longitudinal ribs or plates that extend between the interior walls of the plunger 26.

Figure 13:
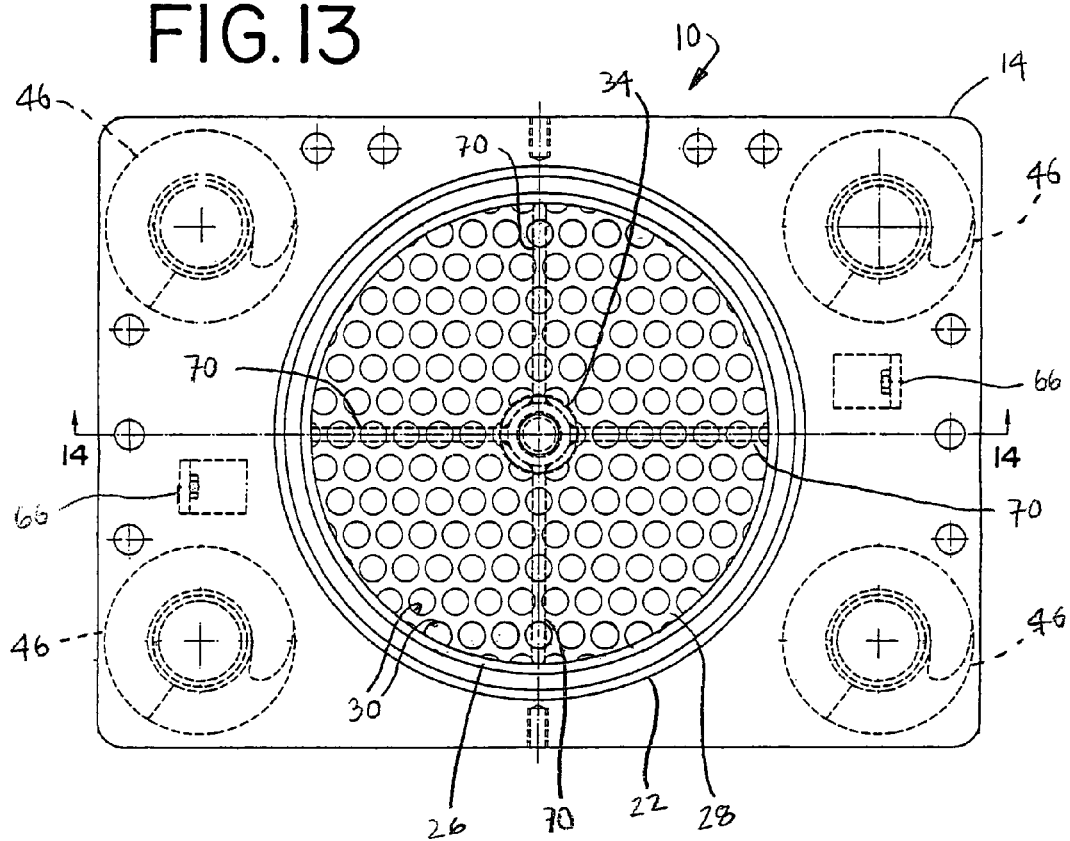
FIG. 13 is a plan view of a further embodiment of a vibration isolation mount according to the present invention.
Figure 14:
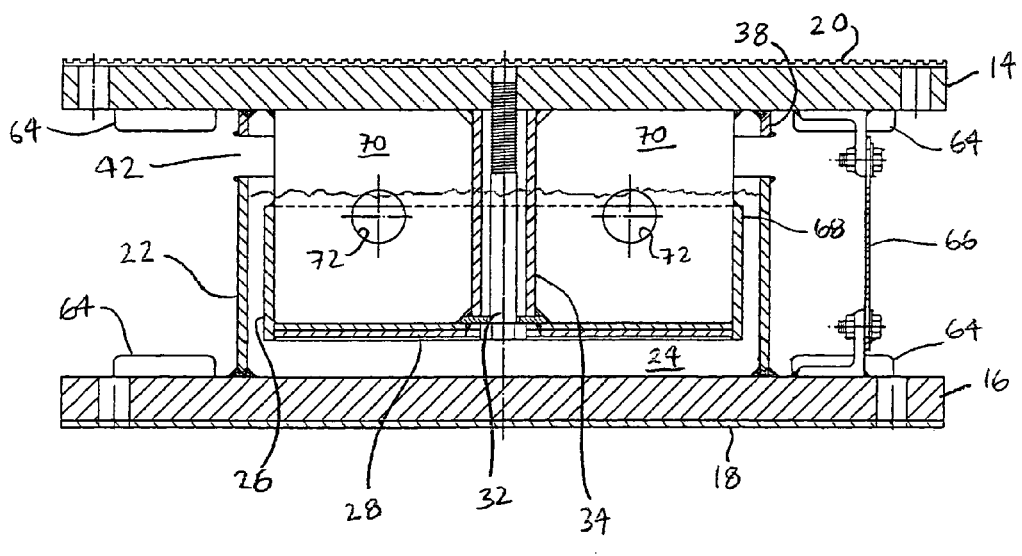
FIG. 14 is an elevational view, in cross-section, taken along line 14—14 of FIG. 13, of the vibration isolation mount illustrated therein.

Turning to FIGS. 13–14, a further embodiment of a machine mounting system 10 according to the present invention is shown. This embodiment is similar to that shown in FIGS. 4–7, except for the structure of the plunger 26. In addition, the embodiment of FIGS. 13–14 also includes bosses 64 on the opposed surfaces of the top and bottom members 14, 16 for seating the optional springs 46 (shown in FIG. 13, but not in FIG. 14). Further, the mount 10 includes a pair of flexible restrainer straps 66 that limit the degree to which the top and bottom plates 14, 16 of the isolator may move apart. The side seal is not shown for the sake of clarity.

In the embodiment of FIGS. 13 and 14, the configuration of the plunger has been modified to reduce the likelihood of leakage of the viscous fluid 24. Specifically, the side wall 68 of the plunger does not extend the full height of the plunger 26. Instead, the upper edge of the side wall 68 is spaced from the top member 14. As can be seen from the drawings, when under a static load, the top edge of the side wall 68 is below the fill height of the viscous fluid 24 in the receptacle. If the mount 10 is subjected to a dynamic load in which the plunger 26 is advanced into the receptacle 22 at a rate that is faster than the rate the viscous fluid can flow through the openings 30 in the plate 28, the level of the viscous fluid between the side walls of the plunger and receptacle can potentially rise to a level higher than the height of the side wall of the receptacle, and overflow the side wall of the receptacle. However, in the embodiment of FIGS. 13 and 14, instead of overflowing the side wall of the receptacle, the viscous fluid overflows the side wall of the plunger to flow into the interior of the plunger. Consequently, the likelihood of leakage of viscous fluid from the isolator is reduced.

As seen in FIGS. 13 and 14, the plunger 26 may have internal baffles 70. As illustrated, four such baffles 70 are shown, which extend radially from the strengthening element 34 and are orthogonal to each other. Thus, the interior of the plunger 26 is divided into four pie-shaped compartments (when viewed from above, as in FIG. 13). Each of the baffles includes a hole 72 that permits viscous fluid to flow freely therethrough, so as to facilitate equalization of the level of viscous fluid 24 in each compartment defined by the baffles. As noted above, a side seal, not shown, bridges the opening between the upper edge of the side wall of the receptacle 22 and the downwardly depending rim 38 on the top plate 14.

It will be observed that by reason by the present invention numerous advantages are achieved with the viscous damper for decreasing vibrations from external and internal forces. Further, it should be understood that the foregoing detailed description has been given for clearness of understanding only, and no unnecessary limitations should understood therefrom, as modifications will be obvious to those skilled in the art.

What is claimed:

1. A vibration damper for a machinery mount having a top member, and a bottom member disposed below and spaced from the top member and adaptable to be positioned on a substructure, comprising:
   (a) a receptacle closed at the bottom and open at the top for vertical disposition on the bottom member so as to have opposed parallel walls as viewed in cross-section, and having a top marginal edge spaced from the top member, thereby defining a chamber adaptable for containing viscous medium;
   (b) a plunger depending downwardly from the top member for vertical disposition partially within said receptacle and concentric therewith; said plunger having opposed parallel walls as viewed in vertical cross-section, and of the same configuration as said receptacle when viewed in plan, thereby defining a circumferential channel with the walls of the receptacle in which the viscous medium is free to flow, said plunger being spaced from said closed bottom of said receptacle so as to be submerged partially in the viscous medium contained in said chamber, and to be free to reciprocate vertically with reference to said receptacle;
   (c) a transversely disposed plate member affixed at about the bottom of the plunger, said plate member having a plurality of apertures to provide fluid communication between said receptacle and said plunger, one or more strengthening members disposed within said plunger and between said top member and said plate and affixed thereto, said plunger and said strengthening members having an opening at a location above the viscous medium to allow for the circulation of air, whereby reciprocation of said plunger allows said viscous medium to pass through said apertures and allows movement of said viscous medium in said circumferential channel between the walls of the receptacle and plunger; and (d) a first tube downwardly depending from said top member and spaced between said receptacle and said plunger, a second tube spaced between said first tube and said plunger and extending upwardly from said bottom member, said second tube having an opening at about the level of said viscous medium thereby maintaining an equal level of viscous medium, said first and second tubes of the of the same configuration of said receptacle and said plunger when viewed in plan.

2. A vibration damper according to claim 1 further including a rim depending downwardly from the top member, said rim being spaced from the top marginal edge of said receptacle and approximately coinciding therewith so as to define a gap, and sealing means encompassing said gap.

3. A vibration damper according to claim 2 wherein said sealing means surrounding said gap is a bellows.

4. A vibration damper according to claim 3 further including one or more strengthening members disposed within said plunger and between said top member and said plate and affixed thereto, said plunger and said strengthening members having an opening at a location above the viscous medium to allow for the circulation of air.

5. A vibration damper according to claim 4 wherein said receptacle and said plunger are cylindrical.

6. A vibration damper according to claim 2 further including one or more strengthening members disposed within said plunger and between said top member and said plate and affixed thereto, said plunger and said strengthening members having an opening at a location above the viscous medium to allow for the circulation of air.

7. A vibration damper according to claim 6 wherein said receptacle and said plunger are cylindrical.

8. A vibration damper according to claim 1 wherein said receptacle and said plunger are cylindrical, and further including an annular rim depending downwardly from the top member, said annular rim being spaced from the top marginal edge of said receptacle and about coinciding therewith so as to define a gap.

9. A vibration damper according to claim 1 wherein said receptacle and said plunger are cylindrical, and further including one or more cylindrical strengthening members disposed within said plunger and between said top member and said plate and affixed thereto, said plunger and said strengthening members having an opening at a location above the viscous medium to allow for the circulation of air.

10. A vibration damper according to claim 1 and further including a plurality of compression springs extending between the top member and the bottom member and arranged exterior to the receptacle.

11. A vibration damper according to claim 10 wherein said springs are arranged adjacent the receptacle.

12. A vibration damper according to claim 1 wherein said plate member has an open area ranging from about 35% to 65% to the total area of the plate.

13. A vibration damper according to claim 1 or claim 7 wherein the plate member has a thickness ranging from about 0.06 inch to 1.0 inch.

14. A vibration damper according to claim 1 wherein said plate member is comprised of two or more identical plates that are stacked and the apertures for the plates are aligned.

15. A vibration damper according to claim 1 wherein said receptacle and said plunger are rectangular.

16. A vibration damper according to claim 15 further including a rim depending downwardly from the top member, said rim being spaced from the top marginal edge of said receptacle and approximately coinciding therewith so as to define a gap, and sealing means encompassing said gap.

17. A vibration damper according to claims 15, further including one or more baffles disposed within said plunger between said top member and said plate and affixed thereto, said plunger and each baffle having an opening to allow the viscous medium to flow therethrough upon reciprocation of the plunger.

18. A vibration damper for a machinery mount having a top member, and a bottom member disposed below and spaced from the top member and adaptable to be positioned on a substructure, comprising:

(a) a receptacle closed at the bottom and open at the top with a vertical side wall and having a top marginal edge spaced from the top member, thereby defining a chamber for containing a viscous medium;

(b) a plunger depending downwardly from the top member for vertical disposition partially within said receptacle and concentric therewith; said plunger having a vertical side wall the same configuration as said receptacle so as to form a circumferential channel with the receptacle side wall in which the viscous medium is free to flow, the plunger side wall having a top marginal edge spaced from the top member, said plunger being spaced from said closed bottom of said receptacle so as to be submerged partially in the viscous medium contained in said chamber, and to be free to reciprocate vertically with reference to said receptacle; and (c) a transversely disposed plate member affixed at about the bottom of said plunger, said plate member having a plurality of apertures to provide fluid communication between said receptacle and said plunger, and defining with the plunger side wall an interior of said plunger whereby reciprocation of the plunger in one direction or the other will allow said viscous medium to pass through said apertures and will allow movement of said viscous medium in said circumferential channel between the walls of the receptacle and plunger and over the top marginal edge of the plunger side wall into the interior of the plunger.

* * * * *